Nov. 17, 1970  J. SPITERI  3,541,321

TRAILER LIGHTING FIXTURE

Filed Aug. 13, 1968  4 Sheets-Sheet 1

INVENTOR.
JOSEPH SPITERI

BY Charles L. Lovercheck
attorney

INVENTOR.
JOSEPH SPITERI
BY Charles L. Lovercheck
attorney

Nov. 17, 1970  J. SPITERI  3,541,321

TRAILER LIGHTING FIXTURE

Filed Aug. 13, 1968  4 Sheets-Sheet 3

INVENTOR.
JOSEPH SPITERI
BY Charles L. Lovercheck
attorney

Nov. 17, 1970     J. SPITERI     3,541,321
TRAILER LIGHTING FIXTURE
Filed Aug. 13, 1968     4 Sheets-Sheet 4
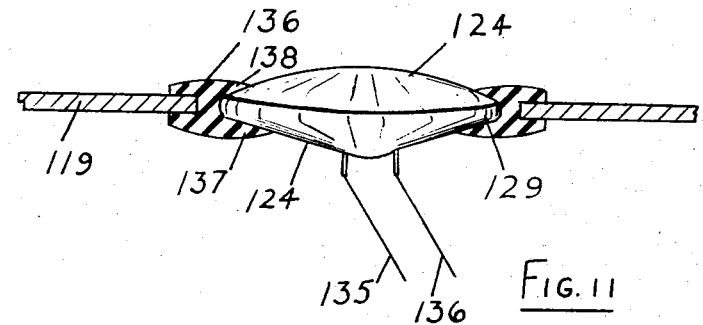
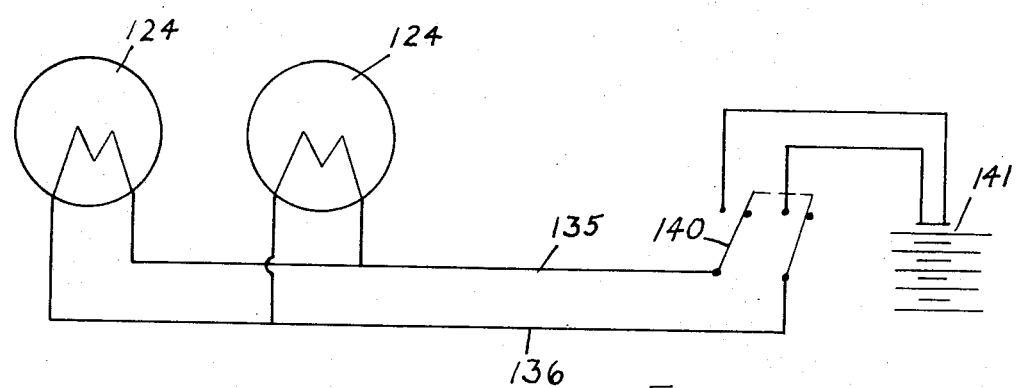
INVENTOR
JOSEPH SPITERI United States Patent Office 3,541,321
Patented Nov. 17, 1970

3,541,321
TRAILER LIGHTING FIXTURE
Joseph Spiteri, Erie, Pa., assignor to Morlite Equipment Company, Girard, Pa., a corporation of Pennsylvania
Filed Aug. 13, 1968, Ser. No. 752,237
Int. Cl. B60g 1/32
U.S. Cl. 240—7.1
6 Claims

ABSTRACT OF THE DISCLOSURE

A light fixture suitable to be supported between two vertical members such as two joists of a building or two frame members of a truck. The fixture is made up of two telescoping frame chassis members that may be extended relative to each other and locked in fixed position. A wing nut and bolt arrangement is supported in one of the telescoping members and it is received in the slot in the other so that they can be locked in extended position. Each of the chassis members has two spaced pins on its end. These pins may be inserted into holes in the sides of joists and the wing nut member can be locked in position to hold the chassis members.

---

Electric lamps are supported in the one chassis member and these electric lamps are connected in series with each other.

It is, accordingly, an object of the invention to provide an improved light fixture.

Another object of the invention is to provide a light fixture which is simple in construction, economical to manufacture and simple and efficient to use.

Yet another object of the invention is to provide an improved light fixture.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 11 is a cross sectional view taken on line 11—11 of FIG. 8;

FIG. 12 is a circuit diagram of the connection of the lamps when connected to a battery.

Figure 1:
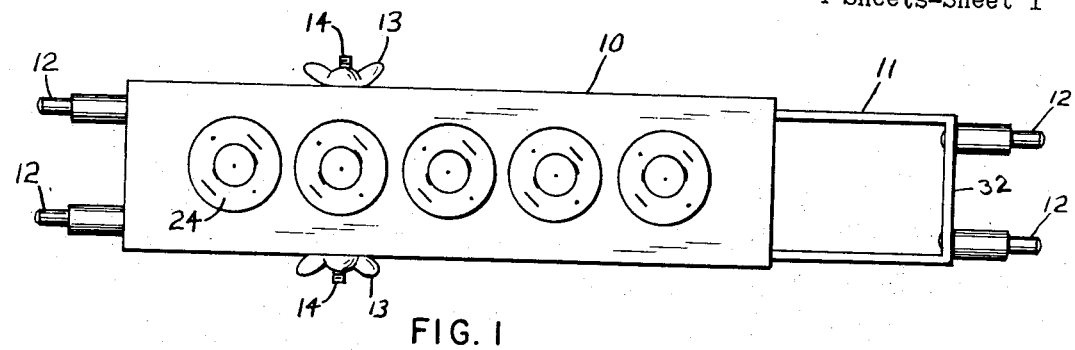
FIG. 1 is a bottom view of the fixture according to the invention.
Figure 2:
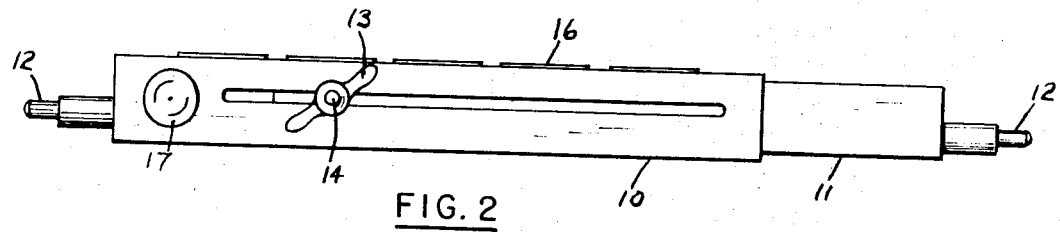
FIG. 2 is a side view of the fixture.
Figure 3:
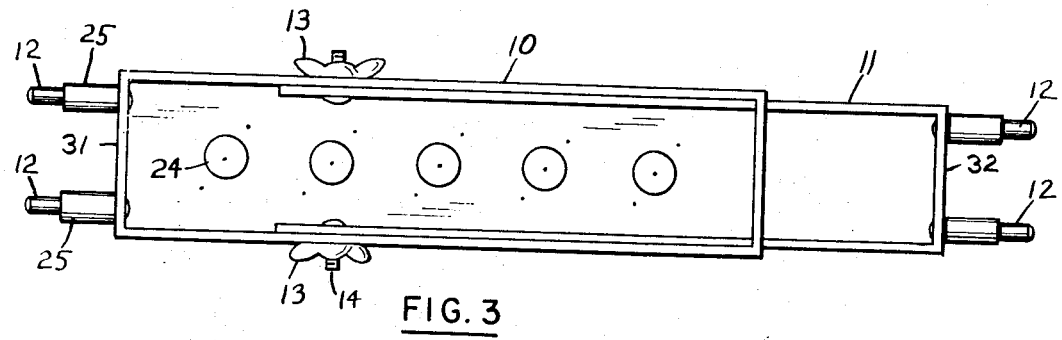
FIG. 3 is a top view of the fixture.
Figure 4:
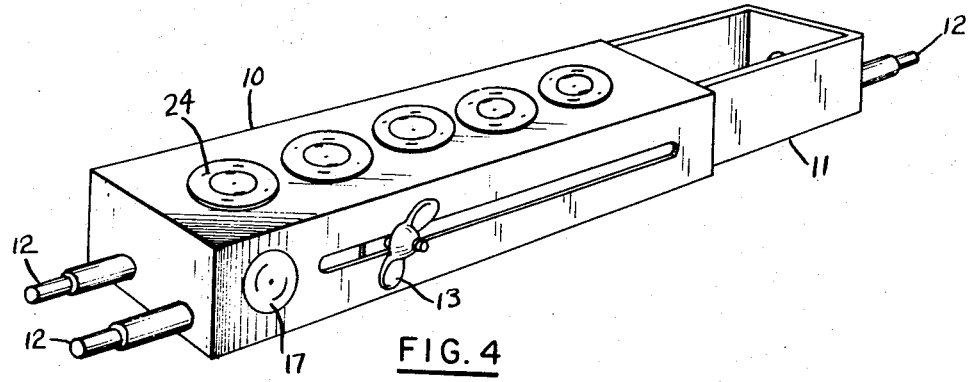
FIG. 4 is a bottom view of the fixture shown in isometric.
Figure 5:
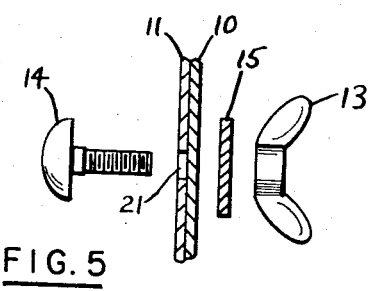
FIG. 5 is an exploded cross sectional view showing the locking members for locking the fixture chassis members together.
Figure 6:
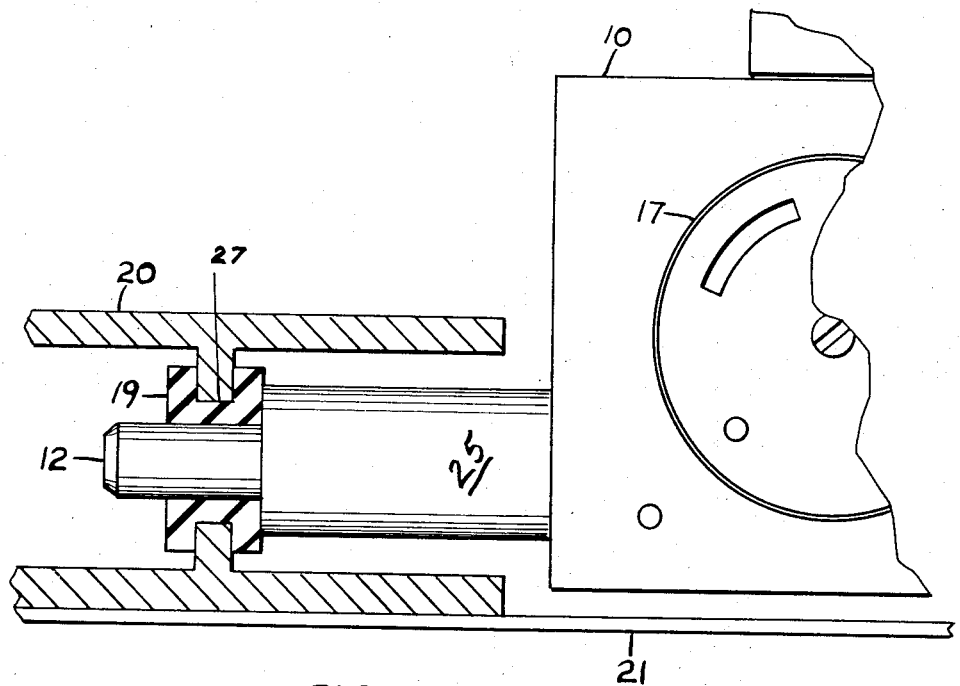
FIG. 6 is an enlarged broken view partly in cross section showing the fixture support in a joist.
Figure 7:
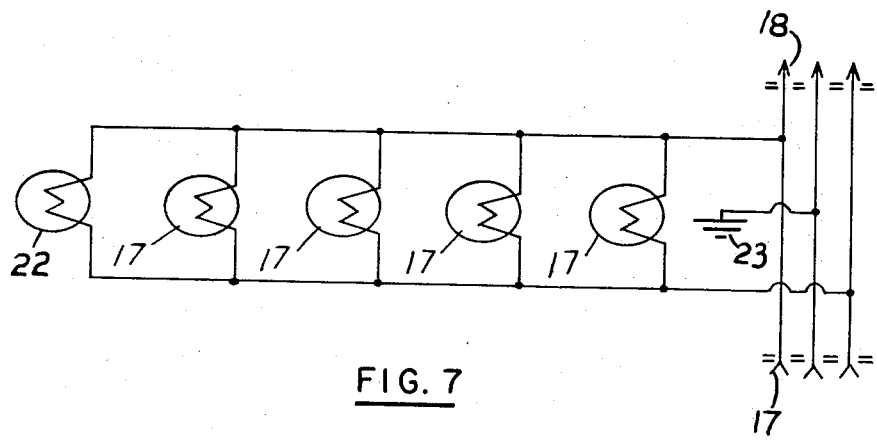
FIG. 7 shows an electrical connection of the lamps.

Now with more particular reference to the drawings, the chassis is made up of the two hollow chassis members 10 and 11. Members 10 and 11 are made of stamped sheet metal, for example, or other suitable material. Members 10 and 11 are formed in U-shape and one telescopes in the other, that is, the chassis member 11 telescopically slides inside the member 10. The member 11 has holes 21 that receive the round headed, square shanked carriage bolt 14. Bolts 14 slide in slots 30 in the sides of member 10. The bolts 14 have wing nut 13 on them which lock the two parts of the chassis in rigid position.

The ends 31 and 32 of each chassis member have the pins 12 on them and the pins 12 have sleeves 25. The pins 12 may be inserted into openings, such as openings 27 in a roof bow of a trailer or in holes in the joists in a building. The sleeves 25 limit the extent to which the pins 12 may enter the roof bow. The roof bow has grommets which may be made of insulating material to insulate the chassis against shock and against electrical short circuits.

The electrical sockets 24 are supported on the chassis member 10 and these sockets may support electrical lamps, such as incandescent lamps. It will be noted that the bows 20 support the top 21 of the truck.

The electrical lamps 22 are connected in parallel as shown on the power line indicated. The electrical connections may be connected to the plugs 17 and 18. A suitable electrical connection will be connected to the plug 17 to connect it to the suitable electrical supply.

Figure 8:
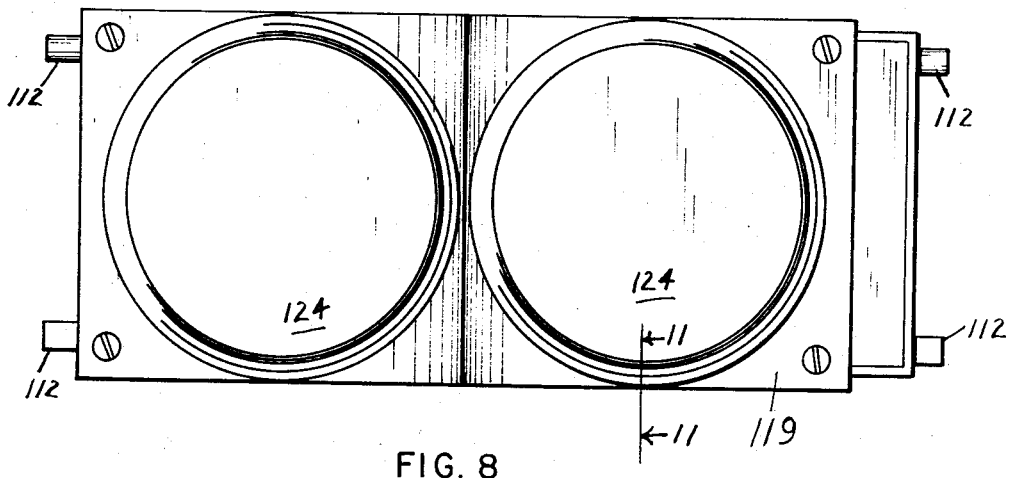
FIG. 8 is a top view of another embodiment of the invention.
Figure 9:
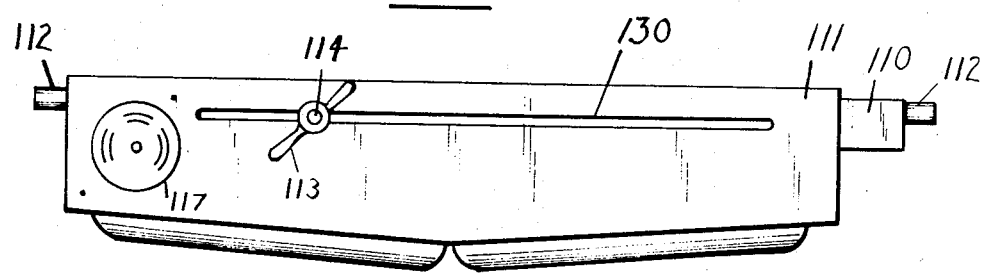
FIG. 9 is a side view of the embodiment shown in FIG. 8.
Figure 10:
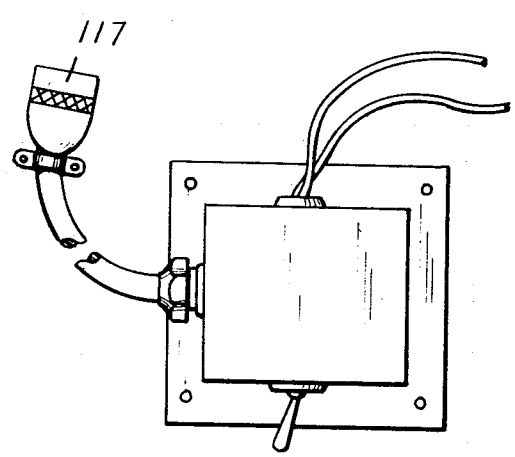
FIG. 10 is a view of a transformer used with the fixture shown in FIGS. 8 and 9.

The embodiment of the invention shown in FIGS. 8 through 11 shows a chassis made up of two hollow chassis members 110 and 111 which may be made of sheet metal or some other suitable material. The chassis members 110 and 111 are formed in a U-shape and the section 110 telescopes into the section 111. The member 111 has holes in it that receive the bolts 114 and these bolts slide in slots 130 in the sides of the member 111. Wing nuts 113 lock the two parts 110 and 111 and the chassis together. The pins 112 fixed to the other ends of the members 110 and 111 may be received in suitable spaced holes in a trailer or the like.

The electrical lamps 124 are cradled in neoprene grommets 136 which are received in holes in the top plate 119 of member 111. The grommets are H-shaped in cross section and the inner leg 137 is considerably longer than the outer leg 138 so that it underlies the lamp 124. It will be noted that the lamps 124 are relatively flat and have a relatively thin outer peripheral flange 129. These lamps are connected to the lines 135 and 136 through the switch 140 and thence to the battery 141.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A light fixture comprising
   a first hollow chassis member and a second hollow chassis member,
   said first chassis member being telescopically received in said second chassis member,
   lamp means,
   means supporting said lamp means on said second chassis member,
   connection means connected to said lamp means for connecting said lamp means to a source of electricity,
   first pins attached to one end of said first chassis member and extending axially therefrom,
   second pins attached to an end of said second chassis member at a position remote from said first pins and extending in the opposite direction,
   said pins being adapted to be received in holes in a roof bow or the like,
   and means to lock said chassis members in fixed relation to each other when said pins on said first chassis member and said second chassis member are received in said roof bows or the like.

2. The fixture recited in claim 1 wherein said means to lock said chassis members in position comprises
said second chassis member having a slot in one side,
a bolt extending through a hole in said first chassis member and into said slot,
a nut on said bolt locking said chassis members together.

3. The fixture recited in claim 1 wherein said hollow chassis members are made in the form of bows generally rectangular in cross section and each said chassis member having two sides spaced from each other,
an open top and an end closing between said sides and said bottom,
said bottoms of said chassis members and said sides and said ends forming a substantially closed space in said lamp wherein said wires are received.

4. The fixture recited in claim 3 wherein said lamps are fixed in said bottom of said second chassis member and in aligned relation to each other.

5. The light fixture recited in claim 1 wherein said means supporting said lamp means on said chassis comprises an opening in one wall of one said chassis member,
an annular grommet diposed in said opening,
said grommet being generally H-shaped in cross section, having an outer peripheral groove and an inner peripheral groove,
said lamp being generally round and terminating in an outwardly directed annular flange,
the outer edges of said flange being received in said inner peripheral groove,
the marginal edge of said chassis defining said opening being received in said outwardly directed groove.

6. The fiixture recited in claim 5 wherein said grommet has an inner leg and an outer leg defining said inner peripheral groove,
said inner leg being substantially longer than said outer leg, said inner leg being disposed in engagement with said lamp over substantially its entire area.

References Cited
UNITED STATES PATENTS

| | | | |
|---|---|---|---|
| 3,087,051 | 4/1963 | Black | 240—7.1 |
| 3,093,324 | 6/1963 | Dobrkin | 240—8.2 |
| 3,109,598 | 11/1963 | Morgan | 240—8.2 |
| 3,112,888 | 12/1963 | McKenzie | 240—8.3 |

NORTON ANSHER, Primary Examiner

J. F. PETERS, JR., Assistant Examiner

U.S. Cl. X.R.

240—.2, 41.55, 52.1